(12) United States Patent
Liu et al.

(10) Patent No.: US 12,010,460 B2
(45) Date of Patent: Jun. 11, 2024

(54) MONITORING DEVICE AND MONITORING METHOD

(71) Applicant: BOE TECHNOLOGY GROUP CO., LTD., Beijing (CN)

(72) Inventors: Tong Liu, Beijing (CN); Hao Chen, Beijing (CN); Bingchuan Shi, Beijing (CN); Hao Fang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 174 days.

(21) Appl. No.: 17/427,476

(22) PCT Filed: Oct. 29, 2020

(86) PCT No.: PCT/CN2020/124658
§ 371 (c)(1),
(2) Date: Jul. 30, 2021

(87) PCT Pub. No.: WO2022/087942
PCT Pub. Date: May 5, 2022

(65) Prior Publication Data
US 2022/0321834 A1    Oct. 6, 2022

(51) Int. Cl.
*H04N 7/18* (2006.01)
*G02B 7/02* (2021.01)
*G02B 7/182* (2021.01)

(52) U.S. Cl.
CPC ................ *H04N 7/18* (2013.01); *G02B 7/02* (2013.01); *G02B 7/182* (2013.01)

(58) Field of Classification Search
CPC .......... G07F 9/026; H04N 7/18; H04N 7/183; G02B 7/02; G02B 7/182
See application file for complete search history.

(56) References Cited

U.S. PATENT DOCUMENTS 8,842,183 B2 *   9/2014   Glickman ................ B25H 3/00
                                                         348/165
9,041,508 B2 *   5/2015   Glickman ................ H04N 7/18
                                                         382/256
(Continued)

FOREIGN PATENT DOCUMENTS

CN       201522575 U    7/2010
CN       108477937 A    9/2018
(Continued)

*Primary Examiner* — Boubacar Abdou Tchoussou
(74) *Attorney, Agent, or Firm* — HOUTTEMAN LAW LLC

(57) ABSTRACT

The monitoring device of the disclosure includes a carrying unit having at least one carrying area for carrying a monitored object, at least part of the carrying area is provided with a corresponding image capturing unit and a corresponding optical path adjusting unit; the image capturing unit captures a monitoring image of the carrying area, each image capturing unit has a preset field of view, each image capturing unit forms the monitoring image according to light incident from the field of view; at least part of the carrying area is an extension area, the extension area is positioned outside the field of view of the image capturing unit; the optical path adjusting unit enables the light emitted from the extension area of the carrying area corresponding thereto to enter the image capturing unit from the field of view of the image capturing unit corresponding to the carrying area.

13 Claims, 9 Drawing Sheets

(56) References Cited

U.S. PATENT DOCUMENTS

| | | | |
|---|---|---|---|
| 10,023,341 B1* | 7/2018 | Christopher | B65B 61/26 |
| 10,730,653 B2* | 8/2020 | Christopher | G06T 7/0016 |
| 10,918,272 B2* | 2/2021 | Das | A61B 1/0655 |
| 10,943,112 B2* | 3/2021 | Lipsey | B25H 3/028 |
| 2005/0031171 A1* | 2/2005 | Krukowski | G07D 7/12 |
| | | | 382/114 |
| 2008/0303904 A1* | 12/2008 | Hsieh | B25H 3/02 |
| | | | 348/E7.086 |
| 2010/0039513 A1* | 2/2010 | Glickman | B25H 3/00 |
| | | | 382/165 |
| 2010/0234986 A1* | 9/2010 | Clopton | G06Q 10/087 |
| | | | 709/201 |
| 2018/0091782 A1 | 3/2018 | Bashkin | |
| 2018/0290779 A1* | 10/2018 | Christopher | B65B 5/103 |
| 2020/0019783 A1 | 1/2020 | Deng et al. | |
| 2020/0364648 A1* | 11/2020 | Kernick | G06T 3/40 |
| 2020/0364650 A1* | 11/2020 | Kernick | G06K 7/1413 |
| 2020/0401987 A1 | 12/2020 | Deng et al. | |

FOREIGN PATENT DOCUMENTS

| | | | |
|---|---|---|---|
| CN | 108780505 A | 11/2018 | |
| CN | 109040539 A | 12/2018 | |
| CN | 109191668 A | 1/2019 | |
| CN | 208781326 U | 4/2019 | |
| CN | 109902549 A | 6/2019 | |
| CN | 110633704 A | 12/2019 | |
| CN | 111428621 A | 7/2020 | |

* cited by examiner

MONITORING DEVICE AND MONITORING METHOD

TECHNICAL FIELD

The present disclosure relates to the field of monitoring technology, and in particular to a monitoring device and a monitoring method.

BACKGROUND

In many fields such as intelligent exhibition, automatic vending and the like, exhibited exhibits, sold commodities and the like need to be monitored, and the monitoring may be carried out by acquiring images of the exhibited exhibits or the commodities through an image capturing unit (such as a camera, a video cam and the like).

SUMMARY

Embodiments of the disclosure provide a monitoring device and a monitoring method.

In a first aspect, an embodiment of the present disclosure provides a monitoring device, including a carrying unit, the carrying unit is provided with at least one carrying area for carrying a monitored object, and at least part of the carrying area is provided with a corresponding image capturing unit and a corresponding optical path adjusting unit; where,
    the image capturing unit is configured to capture a monitoring image of the carrying area corresponding to the image capturing unit, and the image capturing unit is provided with a preset field of view and is configured to form the monitoring image according to light emitted from the field of view;
    at least part of the carrying area having the corresponding image capturing unit and the corresponding optical path adjusting unit is an extension area, and the extension area is positioned outside the field of view of the image capturing unit corresponding to the carrying area where the extension area is positioned;
    the optical path adjusting unit is configured to enable the light emitted from the extension area of the carrying area corresponding thereto to enter the image capturing unit from the field of view of the image capturing unit corresponding to the carrying area.

In some implementations, at least part of optical path adjusting units include a mirror, and the mirror is configured to reflect light emitted from the extension area of the carrying area corresponding to the optical path adjusting unit to which the mirror belongs, so that the reflected light is incident into the image capturing unit from the field of view of the image capturing unit corresponding to the carrying area.

In some implementations, the field of view of the image capturing unit corresponding to each of the at least part of the optical path adjusting units including the mirror faces away from the carrying area corresponding thereto;
    the mirror is provided with a reflecting surface, and the reflecting surface faces the image capturing unit corresponding to the optical path adjusting unit to which the reflecting surface belongs and the carrying area.

In some implementations, the mirror includes a plane mirror.

In some implementations, the mirror includes a convex mirror.

In some implementations, at least part of optical path adjusting units include a lens, and the lens is configured to refract light emitted from the extension area of the carrying area corresponding to the optical path adjusting unit to which the lens belongs, so that the refracted light is incident into the image capturing unit from the field of view of the image capturing unit corresponding to the carrying area.

In some implementations, the field of view of the image capturing unit corresponding to each of the at least part of the optical path adjusting units including the lens faces the carrying area corresponding to the optical path adjusting unit;
    the lens is a concave lens, and the concave lens is arranged between the image capturing unit corresponding to the optical path adjusting unit to which the concave lens belongs and the carrying area.

In some implementations, all areas in each of at least part of carrying areas are extension areas.

In some implementations, at least part of carrying areas include a base area and the extension area, and the base area is located in the field of view of the image capturing unit corresponding to the carrying area to which the base area belongs.

In some implementations, the carrying unit is provided with at least one carrying surface, and at least part of the carrying area is positioned on the carrying surface;
    at least part of image capturing units are arranged on the carrying surface where the carrying area corresponding to the image capturing unit is positioned, and the field of view of the image capturing unit faces away from the carrying surface.

In some implementations, the carrying unit is provided with at least one carrying surface, and at least part of carrying areas is positioned on the carrying surface;
    at least part of image capturing units is spaced from the carrying surface where the carrying area corresponding to the image capturing unit is located.

In some implementations, the monitoring device further includes:
    an image processing unit configured to determine a state of the monitored object from the monitoring image.

In some implementations, the monitoring device further includes:
    a prompt unit configured to give a prompt according to the state of the monitored object.

In some implementations, the monitoring device further includes:
    an output unit configured to output the monitoring image.

In some implementations, the monitoring device is an exhibition device or vending device.

In a second aspect, an embodiment of the present disclosure provides a monitoring method, including:
    acquiring a monitoring image; the monitoring image is captured by the image capturing unit of the monitoring device described above; and
    determining the state of the monitored object according to the monitoring image.

In some implementations, the determining the state of the monitored object according to the monitoring image includes:
    determining a movement state of the carrying area according to the monitoring image, and determining a real-time state of the monitored object according to the monitoring image; and
    determining the state of the monitored object according to the movement state and the real-time state.

DRAWINGS

The accompanying drawings are included to provide a further understanding of the embodiments of the disclosure, and are incorporated in and constitute a part of this specification, illustrate embodiments of the disclosure and together with the description serve to explain the principles of the disclosure and not to limit the disclosure. The above and other features and advantages will become more apparent to those skilled in the art by describing exemplary embodiments thereof in detail with reference to the accompanying drawings, in which.

Figure 1:
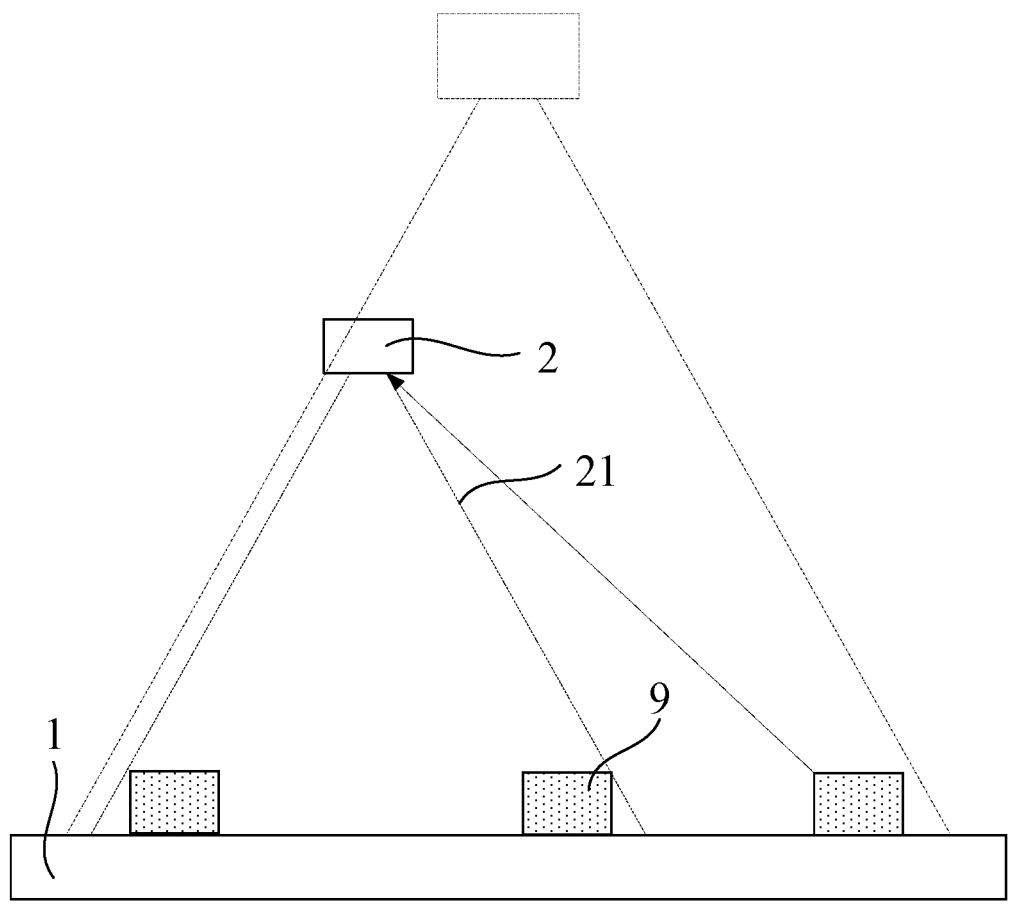
FIG. 1 is a schematic diagram illustrating a monitoring approach in the related art.

The meanings of reference numerals in the embodiments of the present disclosure are as follows:

1. carrying unit; 11. carrying area; 111. extension area; 112. base area; 2. image capturing unit; 21. field of view; 3. optical path adjusting unit; 31. mirror; 311. plane mirror; 312. convex mirror; 32. lens; 321. concave lens; 9. monitored object.

DETAILED DESCRIPTION

In order to make those skilled in the art better understand the technical solutions of the embodiments of the present disclosure, the following describes a monitoring device and a monitoring method provided in the embodiments of the present disclosure in detail with reference to the accompanying drawings.

The embodiments of the present disclosure will be described more fully hereinafter with reference to the accompanying drawings, but the embodiments shown may be embodied in different forms and should not be construed as limited to the embodiments set forth herein. Rather, these embodiments are provided so that this disclosure will be thorough and complete, and will fully convey the scope of the disclosure to those skilled in the art.

Embodiments of the present disclosure may be described with reference to plan and/or cross-sectional views by way of idealized schematic illustrations of the present disclosure. Accordingly, the example illustrations may be modified in accordance with manufacturing techniques and/or tolerances.

The embodiments of the present disclosure and features of the embodiments may be combined with each other without conflict.

The terms used in the disclosure are for the purpose of describing particular embodiments only and are not intended to be limiting of the disclosure. As used in this disclosure, the term "and/or" includes any and all combinations of one or more of the associated listed items. As used in this disclosure, the singular forms "a", "an" and "the" are intended to include the plural forms as well, unless the context clearly indicates otherwise. The terms "including," "comprising," "made of . . . ," as used in this disclosure, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used in this disclosure have the same meaning as commonly understood by one of ordinary skill in the art. It will be further understood that terms, such as those defined in commonly used dictionaries, should be interpreted as having a meaning that is consistent with their meaning in the context of the related art and the present disclosure, and will not be interpreted in an idealized or overly formal sense unless expressly so defined herein.

The embodiments of the present disclosure are not limited to the embodiments shown in the drawings, but include modifications of configurations formed based on a manufacturing process. Thus, the areas illustrated in the drawings have schematic properties, and the shapes of the areas shown in the drawings illustrate specific shapes of areas of elements, but are not intended to be limiting.

Referring to FIG. 1, in many fields such as intelligent display and automatic vending, it is necessary to monitor the exhibited exhibits, the sold commodities (collectively referred to as monitored objects 9), and the like, so as to feed back to the background when the monitored objects 9 are moved, taken, and put back, so that the staff can make a corresponding response, and the monitored objects 9 are prevented from being lost, stolen, and the like.

In some related arts, the monitoring may be performed by using a monitoring image acquired by an image capturing unit 2 (such as a camera, a video cam, etc.), that is, determining a state of the monitored object 9 according to a content in the monitoring image; compared with the monitoring by adopting an infrared sensor, a pressure sensor and the like, the method can obtain richer information and has better monitoring effect.

Referring to FIG. 1, based on a limitation of the imaging principle, a general image capturing unit 2 has a preset field of view 21 within a preset angular range in a preset direction thereof, the field of view 21 is also called "angle range of view for capturing", and is represented by a region between two dotted lines emitted from the image capturing unit 2 in FIG. 1, the same applies below. That is, the image capturing unit 2 can only capture (collect) an object located in the field of view 21, or only light emitted from a region covered by the field of view 21 and incident on the image capturing unit 2 (e.g., incident into a lens) along the field of view 21 can be used to form an image, and light emitted from outside the field of view 21 (indicated by arrow dotted lines in FIG. 1) cannot be used to form an image even if the light enters the image capturing unit 2.

Obviously, due to the limited field of view 21 of the image capturing unit 2, the monitored object 9 that can be monitored by the image capturing unit 2 is limited, i.e., the monitored object 9 can only be monitored if it is located in the area covered by the field of view 21 of the image capturing unit 2.

Therefore, when there are many monitored objects 9 to be monitored, in order to make the field of view 21 (i.e. the monitoring range) cover all the monitored objects 9, referring to a frame formed by dashed-dotted line in FIG. 1, distances between the image capturing unit 2 and the monitored objects 9 may be increased, but this may result in an increase in the size of the corresponding apparatus (because the image capturing unit 2 must be installed in the device), which may not be aesthetically pleasing, waste space, and may increase the cost. Alternatively, the number of image capturing units 2 may be increased, i.e., each image capturing unit 2 monitors only a small part of the monitored objects 9, which also results in a complex and costly apparatus.

In a first aspect, referring to FIGS. 2 to 9, an embodiment of the present disclosure provides a monitoring device.

The monitoring device of the embodiment of the present disclosure is used for monitoring the monitored object 9 (such as an exhibit, a commodity, etc.) to determine the state of the monitored object 9.

The monitored object 9 is an object to be monitored by the monitoring device, such as a specific exhibit, a commodity, and the like, which should be placed in a preset monitoring position. For example, the monitoring device may include one or more carrying areas 11, in each of the carrying areas 11, one or more preset monitoring positions may be provided, while each monitoring location should be provided with a respective monitored object 9.

In some implementations, the monitoring device is an exhibition device or a vending device.

As a way of the embodiment of the present disclosure, the monitoring device may specifically be in the form of an (intelligent) exhibition device, an (automatic) vending device, or the like.

The (intelligent) exhibition device includes an exhibition cabinet (carrying unit 1), and the exhibited exhibit (the monitored object 9) can be placed in the exhibition cabinet for a user to watch and appreciate, and take it out and place it back; furthermore, the user can contact with the staff to buy the exhibit and the like according to the watching result.

The (automatic) vending device includes a container (carrying unit 1), and the commodity to be sold (the monitored object 9) can be placed in the container for a user to see to determine whether to purchase or not, and the commodity can be taken away after the user determines to purchase and completes payment in some ways (such as network payment, staff contact payment and the like).

Certainly, the application scope of the embodiments of the present disclosure is not limited thereto.

For example, the monitoring device of the embodiment of the present disclosure may also be a safety monitoring device (for example, monitoring valuable articles and precious metals by a bank, monitoring precious cultural relics by a museum), an automatic production monitoring device (for example, monitoring the state of products on a production line so as to automatically control the production line to perform corresponding work), and the like, which are not described in detail herein one by one.

Figure 2:
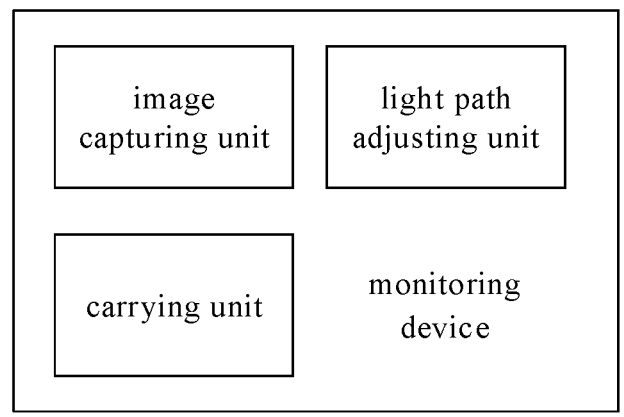
FIG. 2 is a block diagram illustrating components of a monitoring device according to an embodiment of the present disclosure.

Referring to FIG. 2, the monitoring device provided in the embodiment of the present disclosure includes a carrying unit 1, where the carrying unit 1 has at least one carrying area 11 for carrying a monitored object 9, and at least a part of the carrying area 11 has a corresponding image capturing unit 2 and a corresponding optical path adjusting unit 3.

The image capturing unit 2 is configured to capture a monitoring image of the carrying area 11 corresponding thereto, each image capturing unit 2 is provided with a preset field of view 21, and each image capturing unit 2 is configured to form the monitoring image according to light incident from the field of view 21.

At least partial area in the carrying area 11 corresponding to the image capturing unit 2 and the optical path adjusting unit 3 is an extension area 111, and the extension area 111 is located outside the field of view 21 of the image capturing unit 2 corresponding to the carrying area 11 where the extension area 111 is located.

The optical path adjusting unit 3 is configured to allow the light emitted from the extension area 111 of the carrying area 11 corresponding thereto to incident into the image capturing unit 2 from the field of view 21 of the image capturing unit 2 corresponding to the carrying area 11.

The monitoring device of the embodiment of the present disclosure includes the carrying unit 1, which is a structure for carrying the above monitored object 9, specifically, the above exhibition cabinet, container, and the like.

In the embodiment of the present disclosure, the carrying unit 1 includes one or more carrying areas 11 for providing the monitored objects 9 (such as the above exhibits, commodities, etc.), that is, the monitored object 9 should be provided at a specific position (carrying area 11) of the carrying unit 1.

Figure 3:
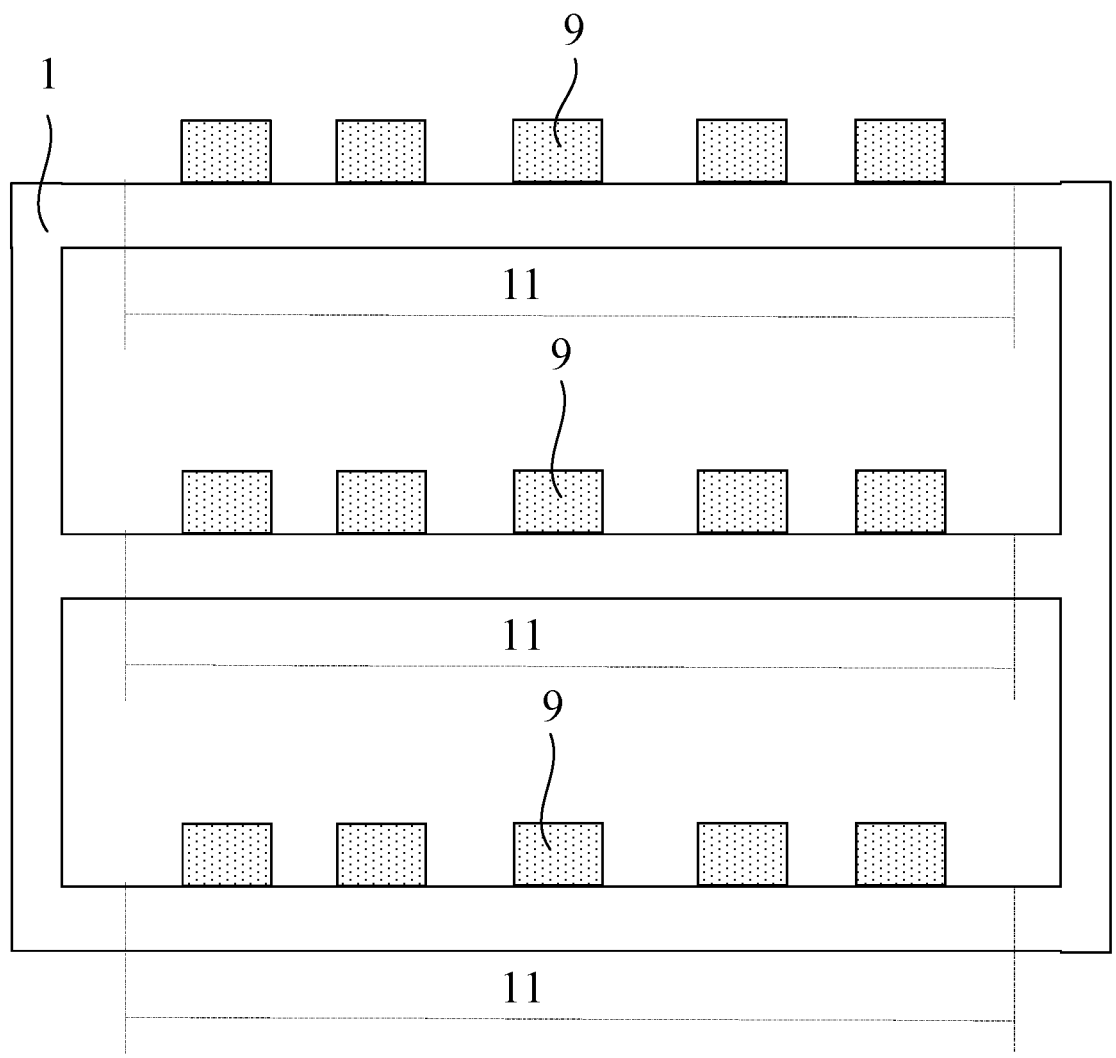
FIG. 3 is a schematic distribution diagram of a carrying area in a monitoring device according to an embodiment of the present disclosure.

For example, the carrying unit 1 may be an exhibition cabinet with reference to FIG. 3, and the exhibition cabinet may include one or more layers, where each layer is one carrying area 11; it is certainly also possible if one layer is subdivided into a plurality of carrying areas 11.

The above "carrying" does not mean that the monitored object 9 must be stabilized in the carrying area 11 by the action of gravity, and there may be a structure (such as a snap structure) for fixing the monitored object 9 in the carrying area 11.

In the embodiment of the present disclosure, at least a part of the carrying areas 11 of the monitoring device each are provided with the corresponding image capturing unit 2 and the corresponding optical path adjusting unit 3.

Among the carrying areas 11 of the monitoring device of the embodiment of the present disclosure, at least a part of the carrying areas each are provided with the corresponding image capturing unit 2 and the corresponding optical path adjusting unit 3, so as to monitor the carrying area 11 through the image capturing unit 2 and the optical path adjusting unit 3.

Certainly, in the monitoring device according to the embodiment of the present disclosure, there may also be a part of the carrying areas 11 without the corresponding image capturing unit 2 and the optical path adjusting unit 3, that is, there may be a part of the carrying areas 11 that are not monitored.

Alternatively, in the monitoring device according to the embodiment of the present disclosure, there may also be a part of the carrying areas 11 that each have only the corresponding image capturing unit 2 and no optical path adjustment unit, that is, the carrying area 11 has no subsequent extension area 111, but is entirely located in the field of view 21 of the image capturing unit 2, so that the monitoring image of the carrying area 11 can be directly collected only through the image capturing unit 2, and the monitoring for the carrying area 11 is completed.

The image capturing unit 2 may be any device with image capturing capability, such as camera, video cam, etc., and each image capturing unit 2 has the field of view 21 in a preset direction and within a preset angle range, and can only capture (collect) an image of an object located within the field of view 21, or only light emitted from the field of view 21 and incident into the image capturing unit 2 (such as a lens) can be used for imaging; while light emitted from other positions cannot be used to form an image, even if it can be irradiated onto the image capturing unit 2.

The carrying area 11 corresponding to the image capturing unit 2 and the optical path adjusting unit 3 includes an extension area 111, where the extension area 111 is located outside the field of view 21 of the image capturing unit 2 corresponding to the carrying area 11, or the extension area 111 is an area that the image capturing unit 2 "originally (i.e., when the optical path adjusting unit 3 is not present)" cannot capture; however, since the extension area 111 belongs to the carrying area 11, it "should" be able to be monitored by the image capturing unit 2, i.e., the image captured by the image capturing unit 2 "should" be one of the carrying area 11.

The optical path adjusting unit 3 is configured to change the transmission path of the light emitted from the extension area 111, so that the corresponding light can be incident from the field of view 21 of the image capturing unit 2 into the image capturing unit 2 (e.g., into a lens) to form an image. That is, although the image capturing unit 2 cannot capture the extension area 111 "originally", the optical path adjusting unit 3 enables the monitoring image actually formed by the image capturing unit 2 to include the extension area 111, that is, the monitoring image includes the "complete" carrying area 11, so that the monitoring for the whole carrying area 11 can be realized according to the monitoring image.

In the embodiment of the present disclosure, the extension area 111 is an area that the field of view 21 of the image capturing unit 2 originally cannot cover, that is, the extension area 111 cannot be monitored only by the image capturing unit 2; by arranging the optical path adjusting unit 3, the light emitted from the extension area 111 can be incident into the image capturing unit 2 from the field of view 21 of the image capturing unit 2, which is equivalent to "extending" the field of view 21 of the image capturing unit 2; therefore, on one hand, the providing position of the image capturing unit 2 may be more flexible (namely, the image capturing unit may be provided at a position where not all the carrying areas 11 can be directly captured), and on the other hand, the image capturing unit 2 can capture more monitored objects 9 at a same position, so that the overall size of the monitoring device can be reduced, and the structural complexity and the cost of the monitoring device can be reduced.

In some implementations, at least a part of optical path adjusting units 3 each include a mirror 31, where the mirror 31 is configured to reflect light emitted from the extension area 111 of the carrying area 11 corresponding to the optical path adjusting unit 3 to which the mirror 31 belongs, so that the reflected light is incident on the image capturing unit 2 from the field of view 21 of the image capturing unit 2 corresponding to the carrying area 11.

Referring to FIGS. 4 to 7, as an implementation of the embodiment of the present disclosure, the optical path adjusting unit 3 may include the mirror 31 so as to reflect light emitted from the extension area 111 into the field of view 21 of the image capturing unit 2 to form the monitoring image including the extension area 111.

In some implementations, the field of view 21 of the image capturing unit 2 corresponding to at least a part of the optical path adjusting units 3 including the mirror 31 faces away from the carrying area 11 corresponding thereto;

the mirror 31 has a reflecting surface which faces both the image capturing unit 2 and the carrying area 11 corresponding to the optical path adjusting unit 3 to which it belongs.

Figure 4:
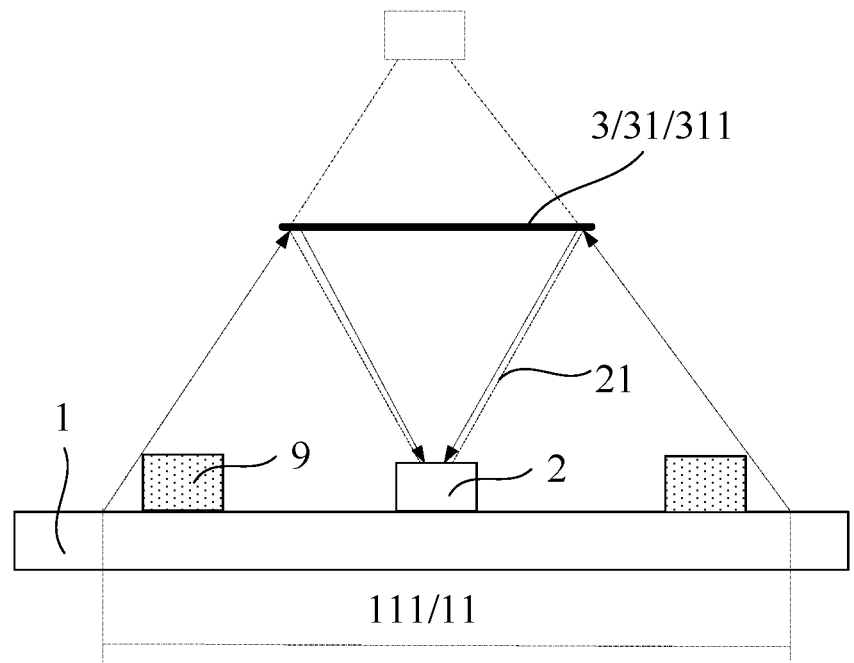
FIG. 4 is a schematic partial side view of a monitoring device in which an optical path adjusting unit includes a plane mirror according to an embodiment of the present disclosure.
Figure 5:
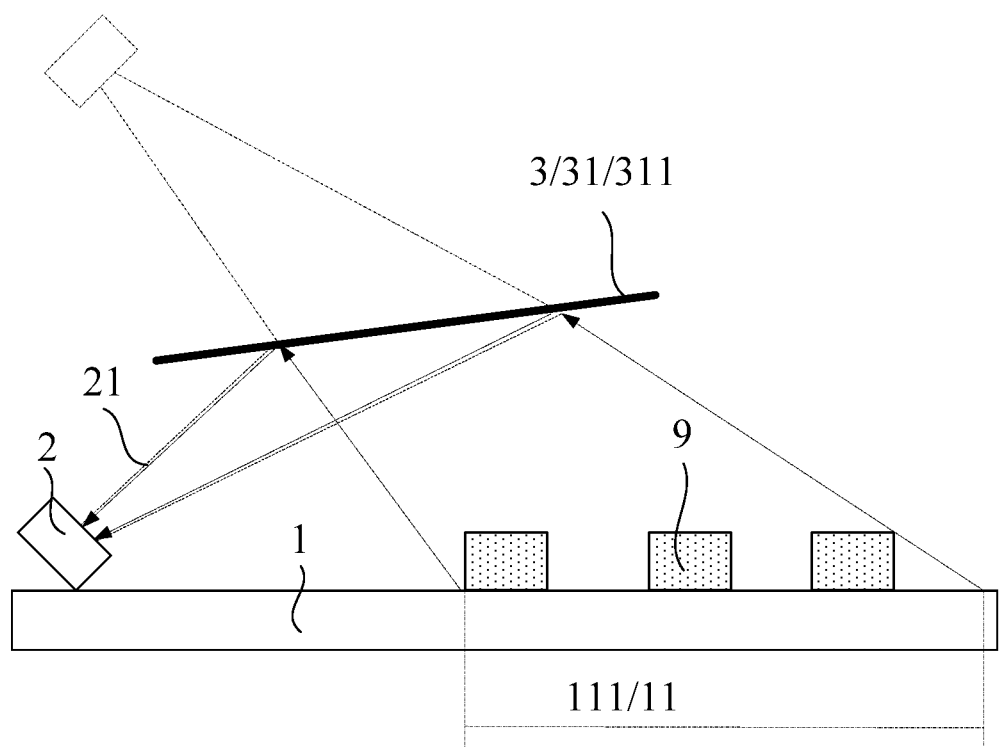
FIG. 5 is a schematic partial side view of another monitoring device in which an optical path adjusting unit includes a plane mirror according to an embodiment of the present disclosure.
Figure 6:
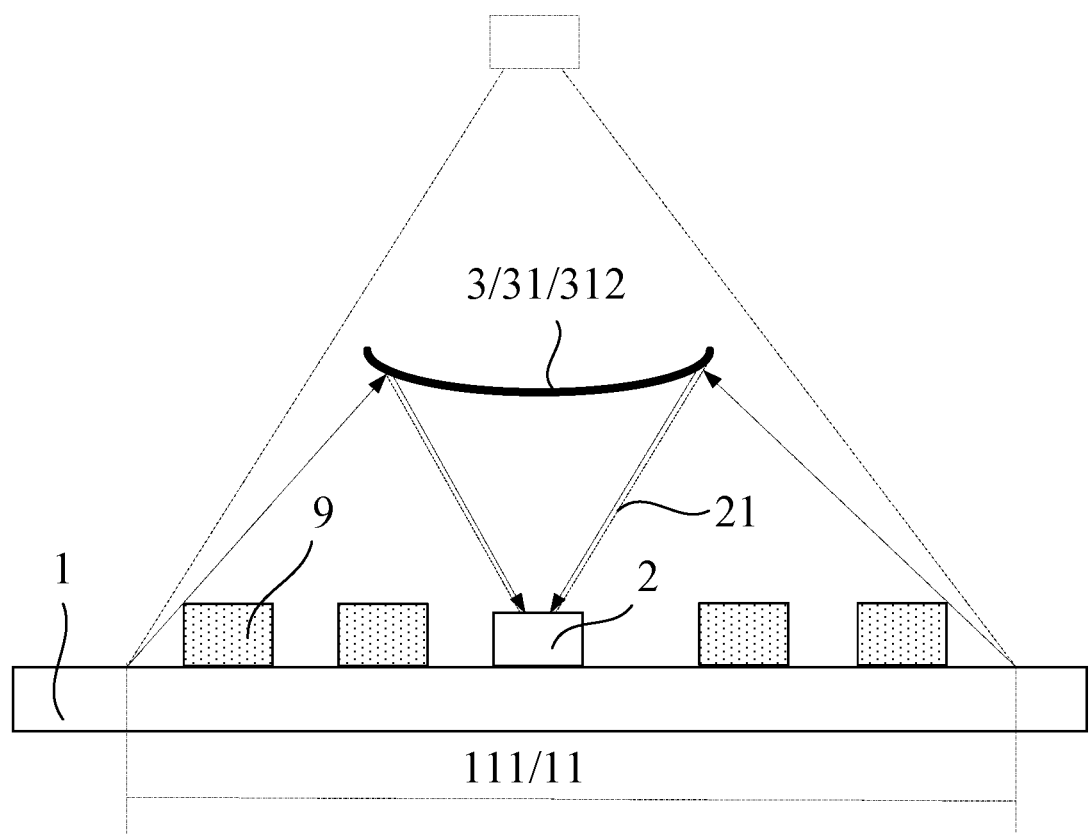
FIG. 6 is a schematic partial side view of a monitoring device in which an optical path adjusting unit includes a convex mirror according to an embodiment of the present disclosure.

Referring to FIGS. 4 to 6, as an implementation of the embodiment of the present disclosure, the field of view 21 of the image capturing unit 2 may face away from the carrying area 11 corresponding thereto; that is, an optical axis of the image capturing unit 2 points away from the carrying area 11 corresponding thereto so as not to intersect the carrying area 11 (whereby the carrying area 11 may be entirely an extension area 11). At this time, the reflecting surface of the mirror 31 in the corresponding optical path adjusting unit 3 should correspond to both the image capturing unit 2 and the carrying area 11; alternatively, the light emitted from the carrying area 11 may be incident on the reflecting surface of the mirror 31, and the field of view 21 of the image capturing unit 2 may also overlap the reflecting surface of the mirror 31.

In some implementations, the mirror 31 includes a plane mirror 311.

Referring to FIGS. 4 and 5, as an implementation of the embodiment of the present disclosure, the above mirror 31 may be a plane mirror 311, that is, the reflecting surface thereof is a plane.

According to the basic optical principle, the image reflected by the plane mirror 311 is not deformed, so that the corresponding monitoring image is not "distorted", which is more favorable for identifying the monitored object 9.

In some implementations, the mirror 31 includes a convex mirror 312.

Figure 7:
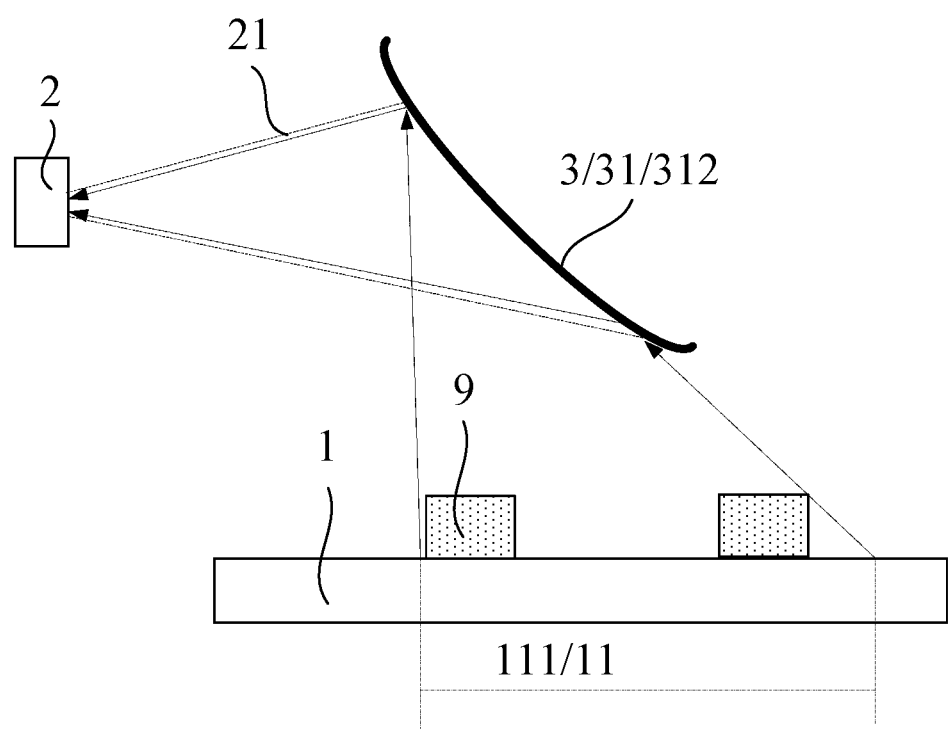
FIG. 7 is a schematic partial side view of another monitoring device in which an optical path adjusting unit includes a convex mirror according to an embodiment of the disclosure.

Referring to FIGS. 6 and 7, as another implementation of the embodiment of the present disclosure, the mirror 31 may also be a convex mirror 312, that is, the reflecting surface thereof is a convex arc surface.

According to the basic optical principle, the reflection of the convex mirror 312 may play a role of diverging light, so that, compared to the way of using the plane mirror 311, the convex mirror 312 can reflect the light emitted from a larger range into the field of view 21 of the image capturing unit 2; that is, the above implementation is equivalent to the function of "extending the field of view 21", so that monitoring over a wider range can be achieved with the same number of image capturing units 2.

Certainly, when the convex mirror 312 is used, the monitoring image captured by the image capturing unit 2 has a certain deformation (distortion), but this does not affect the monitoring by the monitoring image.

For example, the lens of the image capturing unit 2 may be adjusted to eliminate the above distortion; alternatively, the monitoring image captured by the image capturing unit 2 may also be restored through a preset algorithm to obtain a monitoring image with no distortion, i.e., the distortion is removed; alternatively, the state of the monitored object 9 may be determined directly from the monitoring image with distortion, for example, if the monitoring image is processed by a pre-trained image classifier (e.g., a convolutional neural network), then the corresponding image classifier may be obtained by training with the image with corresponding distortion.

Certainly, specific arrangements of the image capturing unit 2 and the mirror 31 in the optical path adjusting unit 3 are various and are not limited to the above specific form.

For example, referring to FIG. 4 to FIG. 7, in order to better form the monitoring image by reflection, the field of view 21 of the image capturing unit 2 may be completely located in the reflecting surface of the mirror 31, so that the monitoring image captured by the image capturing unit 2 is completely obtained by reflection by the mirror 31, and is not an image obtained by "directly" capturing, which is beneficial to performing subsequent image processing.

For another example, the field of view 21 of the image capturing unit 2 may have some positions not overlapping with the reflecting surface of the mirror 31, but directly overlapping with a partial area (subsequent base areas 112) of the carrying area 11; thus, the image capturing unit 2 can capture the image of the base area 112 of the carrying area 11 directly, or can capture the image of the extension area 111 of the carrying area 11 by the reflection of the mirror 31.

For another example, the optical path adjusting unit 3 may include a plurality of mirrors 31 therein, and reflect the light emitted from the extension area 111 into the field of view 21 of the image capturing unit 2 by multiple reflection.

For another example, the optical path adjusting unit 3 may include a plurality of mirrors 31, and the plurality of mirrors 31 respectively reflect the light from the extension areas 111 at different positions to different positions of the field of view 21 of the image capturing unit 2.

Referring to FIGS. 4 to 6, when the mirror 31 is not provided, if the image capturing unit 2 is to be enabled to directly capture the image of the carrying area 11 of the same range, the position of the image capturing unit 2 should be as indicated by the boxes of the dotted-line in FIGS. 4 to 6. It can be seen that the distance between the box of the dotted-line and the carrying area 11 is usually "farther", that is, if there is no optical path adjusting unit, and the image capturing unit 2 is directly disposed at the corresponding position, the monitoring device necessarily includes the corresponding position, so that the overall size of the monitoring device is enlarged, the monitoring device is not beautiful enough, and the monitoring device occupies unnecessary space, and the cost is increased.

In some implementations, each of at least a part of the optical path adjusting units 3 includes a lens 32, and the lens 32 is configured to refract the light emitted from the extension area 111 of the carrying area 11 corresponding to the optical path adjusting unit 3 to which the lens 32 belongs, so that the refracted light enters the image capturing unit 2 from the field of view 21 of the image capturing unit 2 corresponding to the carrying area 11.

Figure 8:
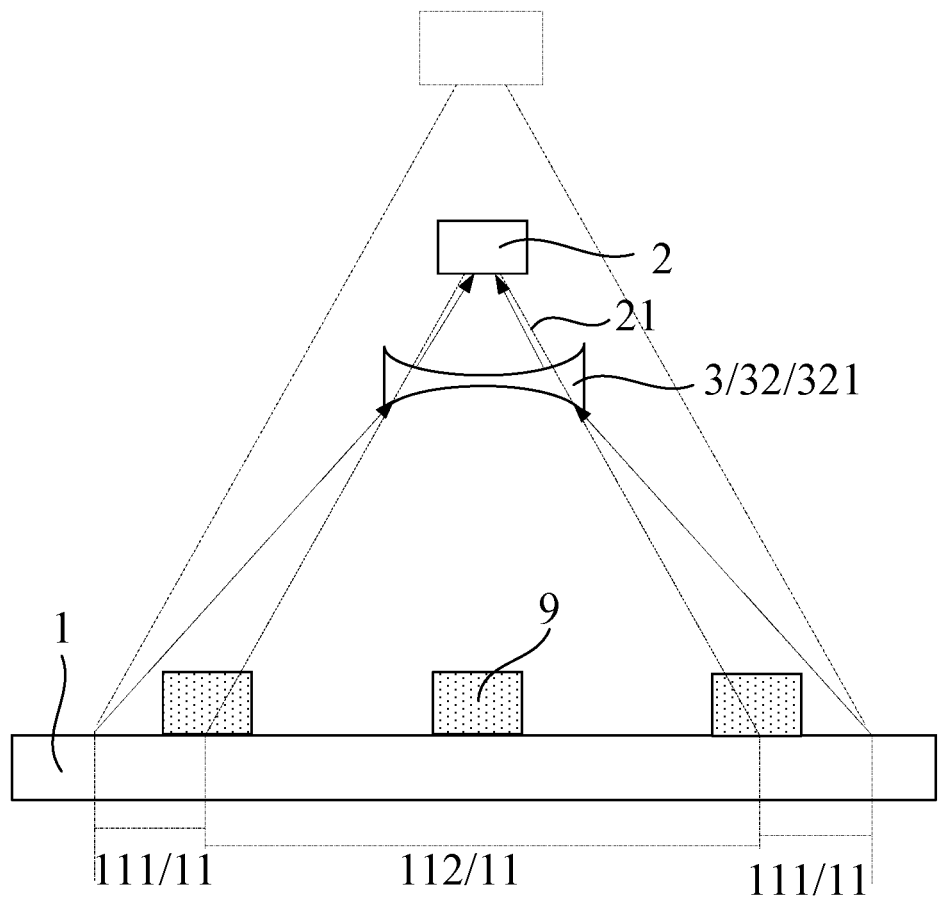
FIG. 8 is a schematic partial side view of a monitoring device in which an optical path adjusting unit includes a concave lens according to an embodiment of the present disclosure.

Referring to FIG. 8, as another implementation of the embodiment of the present disclosure, the optical path adjusting unit 3 may include the lens 32, so that the light emitted from the extension area 111 is incident to the image capturing unit 2 by the refraction of the lens 32.

It should be understood that the lens 32 in the above optical path adjusting unit 3 is different from a lens of the image capturing unit 2, that is, the lens 32 should be a structure provided "outside" the image capturing unit 2.

In some implementations, the field of view 21 of the image capturing unit 2 corresponding to each of at least a part of the optical path adjusting units 3 including the lens 32 faces the carrying area 11 corresponding thereto.

The lens 32 is a concave lens 321, and the concave lens 321 is disposed between the carrying area 11 and the image capturing unit 2 corresponding to the optical path adjusting unit 3 to which the concave lens 321 belongs.

Referring to FIG. 8, as an implementation of the embodiment of the present disclosure, the lens 32 may be a concave lens 321, and is disposed between the image capturing unit 2 and the carrying area 11.

According to the basic optical principle, the concave lens 321 has the function of "diverging" light, so that when the field of view 21 of the image capturing unit 2 itself does not include edge areas (i.e. the extension areas 111) of the carrying area 11, the light emitted from the edge areas (i.e. the extension areas 111) of the carrying area 11 can be refracted into the field of view 21 of the image capturing unit 2 by the function of the concave lens 321, so as to extend the capturing range of the image capturing unit 2.

Certainly, specific arrangements of the image capturing unit 2 and the lens 32 in the optical path adjusting unit 3 are various and are not limited to the above specific form.

For example, referring to FIG. 8, the field of view 21 of the image capturing unit 2 may be completely located within the range of the lens 32, so that the image captured by the image capturing unit 2 is completely obtained by refraction by the lens 32 (certainly, a part of the image may be captured even if the lens is not present) and is not obtained by "directly" capturing, which is beneficial to subsequent image processing.

For another example, a part of the field of view 21 of the image capturing unit 2 may not completely overlapping with the lens 32, but directly overlapping with a part of the carrying area 11; thus, the image capturing unit 2 can capture the image of the base area 112 of the carrying area 11 directly, or can capture the image of the extension area 111 of the carrying area 11 by refraction by the lens 32.

For another example, the optical path adjusting unit 3 may also include a plurality of lenses 32, and the lenses may be in various forms (such as convex lenses, half lenses, etc.).

For another example, the optical path adjusting unit 3 may include both the mirror 31 and the lens 32, and the light emitted from the extension area 111 is incident in the field of view 21 of the image capturing unit 2 by the cooperation of the mirror 31 and the lens 32.

It should be understood that, referring to FIG. 8, when the lens 32 is used as the optical path adjusting unit 3, the purpose of making the image capturing unit 2 closer to the carrying area 11 than when the lens 32 is not provided (indicated by a box of dotted-line in FIG. 8) can be achieved, so that the monitoring device can be reduced in size and cost.

In some implementations, all of areas in at least a part of the carrying areas 11 are extension areas 111.

Referring to FIGS. 4 to 7, as an implementation of the embodiment of the present disclosure, the field of view 21 of the image capturing unit 2 may not overlap the carrying area 11 at all, so that the image capturing unit 2 cannot capture an image at any position of the carrying area 11 at all if there is no optical path adjusting unit 3. Thus, light emitted from all positions of the carrying area 11 must pass through the optical path adjusting unit 3 to enter the corresponding image capturing unit 2 from the field of view 21. That is, all locations of the carrying area 11 are the extension areas 111.

In some implementations, at least a part of the carrying areas 11 each include the base area 112 and the extension area 111, and the base area 112 is located in the field of view 21 of the image capturing unit 2 corresponding to the carrying area 11 to which it belongs.

Referring to FIG. 8, as another implementation of the embodiment of the present disclosure, the field of view 21 of the image capturing unit 2 may also originally overlap a part of the carrying area 11, that is, if there is no optical path adjusting unit 3, the image capturing unit 2 can also capture an image of the part of the carrying area 11; thus, the part of the carrying area 11 that overlaps the field of view 21 of the image capturing unit 2 is referred to as the "base area 112", and the other areas are the above "extension areas 111".

It will be understood that there is no necessary relationship as to how the particular form of the optical path adjusting unit 3 (e.g., being the mirror 31 or the lens 32) is with respect to whether the carrying area 11 includes the base area 112.

In some implementations, the carrying unit 1 has at least one carrying surface, and at least a portion of the carrying area 11 is located on the carrying surface.

At least part of the image capturing units 2 are arranged on the carrying surface where the carrying area 11 corresponding thereto is located, and the field of view 21 faces away from the carrying surface.

Referring to FIGS. 4 to 6, as an implementation of the embodiment of the present disclosure, the image capturing unit 2 and the carrying area 11 corresponding thereto may be disposed on the same carrying surface, or the image capturing unit 2 and the carrying area 11 are disposed on a same side (certainly, referring to FIGS. 4 and 6, the above situation also includes that the image capturing unit 2 is directly disposed in the carrying area 11 corresponding thereto). When the image capturing unit 2 and the carrying area 11 are located on the same side, the field of view 21 necessarily faces away from the carrying surface, so that the image of the corresponding carrying area 11 needs to be obtained through the optical path adjusting unit 3.

When the image capturing unit 2 and the corresponding carrying area 11 are disposed on the same carrying surface, there is no distance between the image capturing unit 2 and the carrying surface, and thus such design is most beneficial to reducing the size of the monitoring device, especially reducing the size of the monitoring device in a direction perpendicular to the carrying surface, in other words, reducing a "height" of the monitoring device.

In some implementations, the carrying unit 1 has at least one carrying surface, and at least a portion of the carrying areas 11 are located on the carrying surface.

A gap is reserved between at least a part of the image capturing units 2 and the carrying surface where the carrying area 11 corresponding to the image capturing units 2 is located.

Referring to FIGS. 7 and 8, as an implementation of the embodiment of the present disclosure, the image capturing unit 2 may also be "spaced" from the carrying surface on which the carrying area 11 corresponding to the image capturing unit 2 is located.

In this case, referring to FIG. 7, an orthographic projection of the image capturing unit 2 on the carrying surface is located outside the carrying area 11, that is, the image capturing unit 2 is located "obliquely outside" of the carrying area 11; alternatively, referring to FIG. 8, the orthographic projection of the image capturing unit 2 on the carrying surface is located in the carrying area 11, i.e., the image capturing unit 2 is located "above" the carrying area 11.

It will be appreciated that when the image capturing unit 2 is directly spaced from the carrying surface, the image capturing unit 2 must be provided on a corresponding support structure, for example on a lower side of an "upper-layered" structure of the carrying unit 1, or on a separate support structure, etc., which will not be described in detail herein.

It should be understood that the above components (such as the mirror 31, the lens 32, etc.) of the optical path adjusting unit 31 may also be disposed on a corresponding support structure, for example, on the lower side of the "upper-layered" structure of the carrying unit 1, or on a separate support structure, etc., which will not be described in detail herein.

In some implementations, the monitoring device further includes:

an image processing unit configured to determine a state of the monitored object 9 from the monitoring image.

Figure 9:
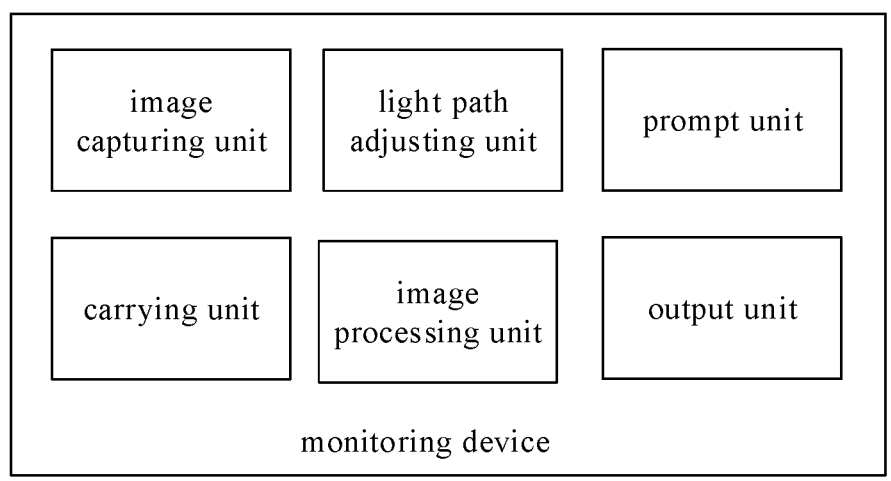
FIG. 9 is a block diagram illustrating components of another monitoring device according to an embodiment of the present disclosure.

Referring to FIG. 9, as an implementation of the embodiment of the present disclosure, the image processing unit (e.g., a central processing unit, a programmable logic controller, etc.) having a data processing capability may be further disposed in the monitoring device, and configured to analyze the monitoring image to determine the state of the monitored object 9 in the corresponding carrying area 11 of the monitoring image, that is, to obtain a "monitoring result".

The "state of the monitored object 9" refers to the state of the monitored object 9 that "should" be in the carrying area 11 (monitoring image), such as the type, number, position, etc. of the monitored object 9 actually located in the carrying area 11; furthermore, the "state of the monitored object 9" may also include a state of the monitored object 9 that should be but actually not in the carrying area 11, such as a case where the monitored object 9 is picked up, out of stock, or the like.

The "determining the state of the monitored object 9 from the monitoring image" may include determining the state of the monitored object 9 according to a single monitoring image, or may include determining the state of the monitored object 9 according to a plurality of monitoring images.

Specific implementations of determining the state of the monitored object 9 from the monitoring image are various, and the state of the monitored object 9 may be determined by a movement state of the carrying area 11 (for example, obtained by analyzing the ratio of movement pixels in the monitoring image), a real-time state of the monitored object 9 (for example, obtained by a pre-trained image classifier), and the like, which will be described in detail later.

It should be understood that if there is no image processing unit in the monitoring device, it is also feasible to directly rely on the staff to watch the monitoring image for monitoring.

In some implementations, the monitoring device further includes:

a prompting unit configured to give a prompt according to the state of the monitored object 9.

Referring to FIG. 9, further, the monitoring device may further include the prompting unit for providing the above state of the monitored object 9 to the staff, so that the staff can know and react accordingly (such as replenishing the monitored object 9 out of stock).

Specific forms of the prompting unit are various. For example, the prompting unit can be a display for displaying a text of a prompted content, a speaker for playing a voice of the prompted content, a transmitting unit (such as a wireless transmitting unit) for transmitting the prompted content (such as transmitting in a wireless way) to a terminal (such as a mobile phone) of the staff, and the like; alternatively, the prompting unit may be an alarm unit or the like that merely plays an alarm sound without giving detailed prompted content.

In some implementations, the monitoring device further includes:

an output unit configured to output the monitoring image.

Referring to FIG. 9, as another implementation of the embodiment of the present disclosure, the monitoring device may also have the output unit for "outputting" the monitoring image to the staff for the staff determining the state of the monitored object 9 according to the monitoring image.

Specific forms of the output unit are various.

For example, the output unit may be a display for displaying the monitoring image; for another example, the output unit may be a transmitting unit (e.g., a wireless transmitting unit) for transmitting the monitoring image (e.g., transmitting via a wireless network) to a terminal (e.g., a mobile phone) of the staff.

It should be understood that, in the monitoring device according to the embodiment of the present disclosure, the above image processing unit (prompting unit) and the output unit may exist simultaneously or only one of them may exist.

In a second aspect, referring to FIGS. 10 to 13, an embodiment of the present disclosure provides a monitoring method.

The method of the embodiment of the present disclosure can be used for monitoring the monitored object, and is implemented based on the above monitoring device, that is, the monitoring image used therein is captured by the image capturing unit of any one of the above monitoring devices.

The method of the embodiment of the present disclosure may be particularly used in the fields of (intelligent) exhibition, (automatic) vending and the like.

The (intelligent) exhibition means that the exhibit (monitored object) may be placed in the exhibition cabinet for the user to watch and appreciate, and may also include taking the exhibit out for viewing and putting it back.

The (automatic) vending refers to placing a commodity (a monitored object) in a container for a user to watch to determine whether to purchase the commodity, and taking the commodity away after the user determines to purchase the commodity and completes payment in some way (such as network payment, contact with the staff for payment, etc.).

Certainly, the application scope of the embodiments of the present disclosure is not limited thereto, and the embodiments of the present disclosure may also be used for safety monitoring (for example, monitoring valuable articles and precious metals by banks, monitoring precious cultural relics by museums), automatic production monitoring (for example, monitoring the state of products on a production line to automatically control the production line to perform corresponding operation), and the like, which will not be described in detail herein.

Figure 10:
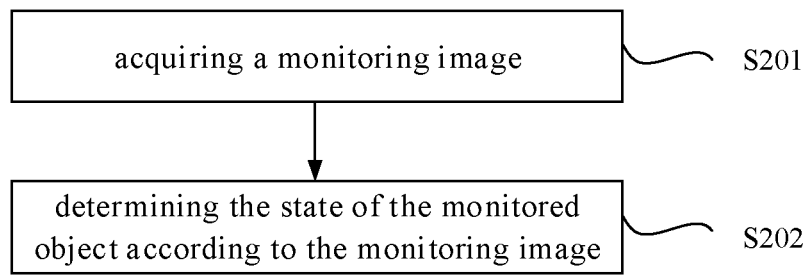
FIG. 10 is a schematic flow chart diagram of a monitoring method according to an embodiment of the present disclosure.

Referring to FIG. 10, the monitoring method of the embodiment of the present disclosure may include following steps S201 to S203.

S201, acquiring a monitoring image.

The monitoring image is captured by the image capturing unit of any one of the monitoring devices.

The monitoring image captured by the image capturing unit of the monitoring device is acquired.

S202, determining the state of the monitored object according to the monitoring image.

The obtained monitoring image is analyzed to determine the state of the corresponding monitored object (such as an exhibit, a commodity and the like), such as determining that the monitored object is located in the carrying area, is taken up to be viewed, or is sold but is out of stock and the like.

Figure 11:
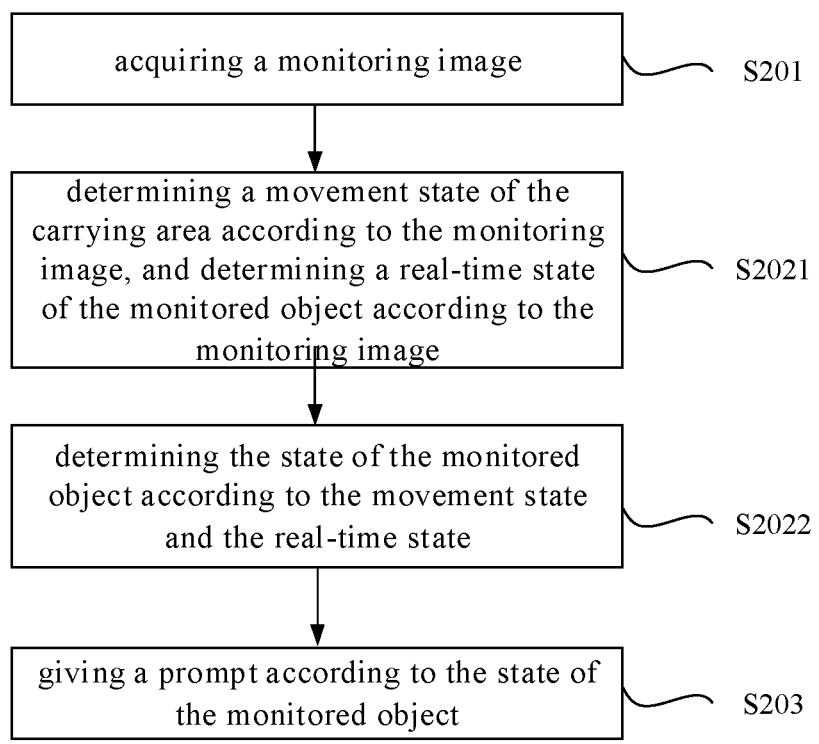
FIG. 11 is a schematic flow chart diagram of another monitoring method according to an embodiment of the present disclosure.

In some implementations, referring to FIG. 11, the determining the state of the monitored object from the monitoring image (step S202) includes:

S2021, determining a movement state of the carrying area according to the monitoring image, and determining a real-time state of the monitored object according to the monitoring image; and S2022, determining the state of the monitored object according to the movement state and the real-time state.

As an implementation of the embodiment of the present disclosure, specifically, the movement state of the carrying area may be determined first, that is, it is determined whether there is "movement occurrence" in the carrying area; and the real-time state of the monitored object in the monitoring image is determined, for example, whether the monitored object is located in the carrying area is determined; and then, the state of the monitored object is determined according to the movement state and the real-time state.

Obviously, if the state of the monitored object changes, then there must be movement in the carrying area (such as movement of putting the monitored object into or taking the monitored object away), and the state of the monitored object may also change after the movement occurs; thus, the state of the monitored object can be obtained by referring to both the above movement state and the real-time state.

The specific ways of determining the movement state of the carrying area and the real-time state of the monitored object are various.

Illustratively, the movement state may be determined by: determining pixels, in the current monitoring image, of which the brightness change exceeds a preset first threshold (for example, the gray-scale value change reaches 50) compared with a previous frame of monitoring image as moving pixels; and when the proportion (quantity proportion) of the moving pixels to all the pixels in the current monitoring image exceeds a preset second threshold (e.g., 30%), judging that there is movement in the carrying area.

Obviously, when there is movement in the carrying area, the corresponding monitoring image will change inevitably, that is, the brightness of the pixels therein will change inevitably, and thus the movement state may be determined by analyzing the brightness of the pixels. The "first threshold" is set because when the ambient brightness changes slightly (for example, someone approaches so that the ambient light is blocked), although the brightness of the pixels in the monitoring image changes, it does not represent that movement actually exists in the carrying area; the "second threshold" is set because if the brightness of a few of the pixels changes, there may be only slight movement at the edge of the carrying area (e.g., a fingertip enters the edge of the carrying area), which usually does not result in a change in the state of the monitored object.

For example, the real-time state of the monitored object may be determined by a preset image classifier (e.g., a convolutional neural network), and the image classifier may determine whether a corresponding monitored object exists in each preset position (monitoring position) of the monitoring image; that is, the image classifier may give a "classification result" of whether there is a monitored object in the monitoring image (or in each monitoring position of the monitoring image) by analyzing the monitoring image.

The image classifier may be obtained by training in advance through Deep Learning (DL), machine learning, and the like, and a specific form and a specific training method thereof and the like are not described in detail herein.

In some implementations, referring to FIG. 11, after determining the state of the monitored object according to the monitoring image (step S202), the method may further include:

Step S203, giving a prompt according to the state of the monitored object.

As an implementation of the embodiment of the present disclosure, after the state of the monitored object is determined according to the monitoring image, a prompt may be further given to the staff according to the state of the monitored object (for example, a prompt that the exhibit is picked up, a prompt that the commodity is out of stock and need to be replenished, or the like), so that the staff performs corresponding operations (for example, paying attention to whether the exhibit is safe, replenishing new commodities, etc.).

Specific manners of giving the prompt are various, such as displaying the characters of the prompt content, playing the voice of the prompt content, transmitting the prompt content (such as sending the prompt content in a wireless manner) to a terminal (such as a mobile phone) of the staff, and the like; alternatively, giving a prompt may be simply playing an alarm sound to indicate that there is a prompt, and not giving the details of the prompt.

Figure 12:
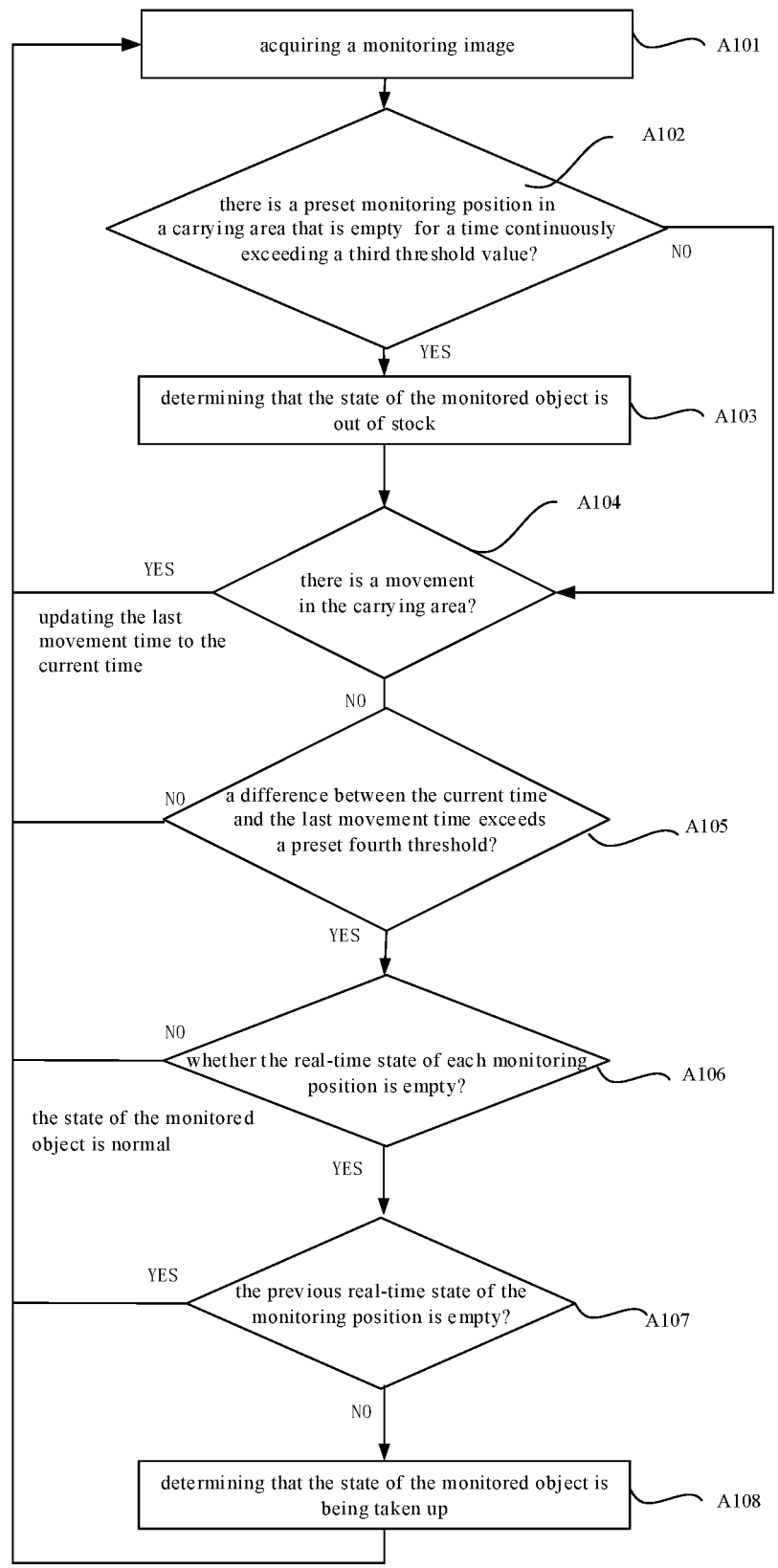
FIG. 12 is a process logic diagram of a monitoring method according to an embodiment of the present disclosure.
Figure 13:
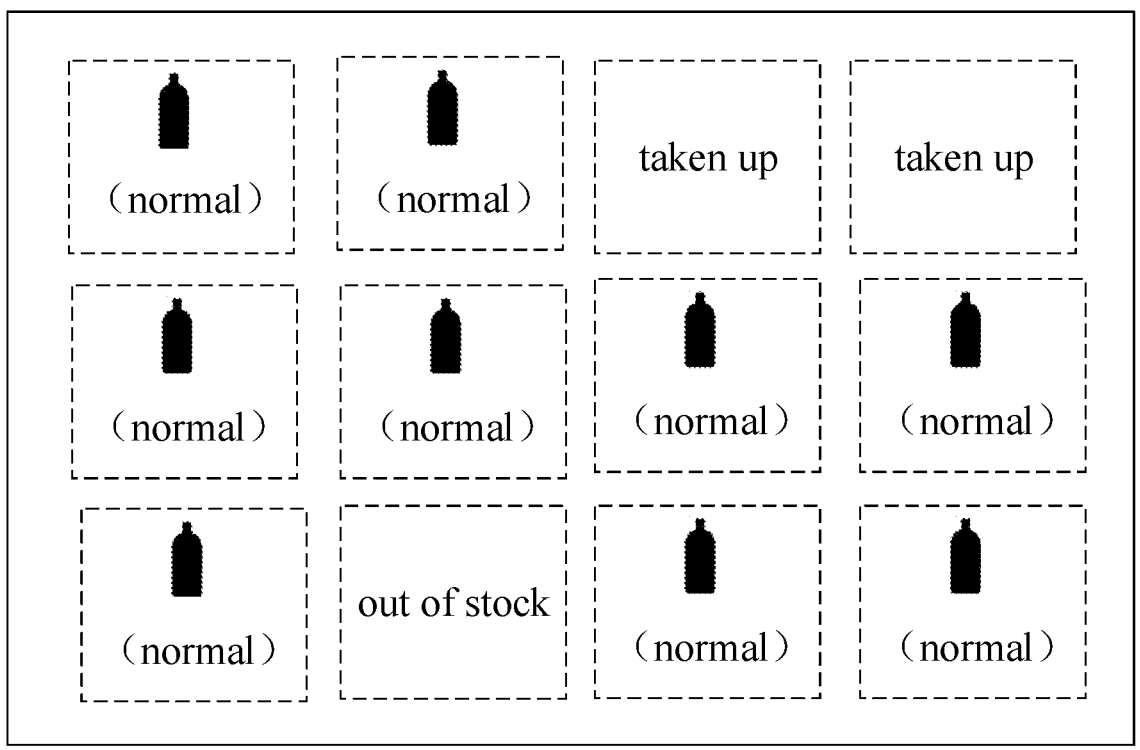
FIG. 13 is a schematic diagram illustrating a monitoring image and a result of a state of a monitored object obtained according to the monitoring image in a monitoring method according to an embodiment of the present disclosure.

For example, in some implementations, referring to FIG. 12 and FIG. 13, the method according to the embodiment of the present disclosure may specifically be performed according to the following logic determination flow.

Step A101, acquiring a monitoring image.

The monitoring image is acquired through the image capturing unit of the monitoring device.

Step A102, judging whether there is a preset monitoring position (namely, a position for providing a monitored object) in a carrying area that is empty (namely, there is no monitored object therein) for a time continuously exceeding a third threshold value; if yes, the step A103 is entered, otherwise, the step A104 is entered.

It is judged whether a monitoring position having no monitored object therein lasts for a long time.

Step A103, determining that the state of the monitored object is out of stock.

In response to that there is a monitoring position where there is no monitored object for a long time, it indicates that the monitored object at the monitoring position have been sold and out of stock, and thus with reference to FIG. 13, it is determined that the state is out of stock.

Step A104, judging whether there is a movement in the carrying area, if so, updating the last movement time to the current time and returning to the step A101, otherwise, entering the step A105.

After judging whether the out of stock exists, whether there is a movement in the carrying area can be judged, and when the movement is in progress, the monitored object is usually blocked, so that the state of the monitored object cannot be accurately judged, the monitoring image can be collected again when the movement is in progress, and the state of the monitored object is continuously judged until the movement is finished.

Step A105, judging whether a difference between the current time and the last movement time exceeds a preset fourth threshold, if not, returning to the step A101, and if so, entering the step A106.

Whether the movement is finished for a period of time is judged, if not, acquiring the monitoring image again, and if so, continuing subsequent judgment.

Step A106, judging whether the real-time state of each monitoring position is empty, if so, entering the step A107, otherwise, determining that the state of the monitored object is normal and returning to the step A101.

After the movement is finished, judging whether a monitored object exists in the monitoring position, if so, referring to FIG. 13, it is indicated that the state of the monitored object is normal, and thus the monitoring image can be collected again; if not, it is indicated that the corresponding monitored object is not present, and the specific state of the monitored object needs to be further judged.

Step A107, judging whether the previous real-time state of the monitoring position is empty, if so, returning to the step A101, and otherwise, entering the step A108.

If the monitoring position is empty before, it is indicated that the monitored object is taken up before (the state of the monitored object should be judged to be out of stock by the last step A108), therefore a monitoring image should be collected again, and determining whether the state of the monitored object changes from being taken up to out of stock (namely, the monitored object is not in the monitoring position for a long time, it is indicated that the monitored object is not taken up to be viewed, but is sold to be out of stock) or not according to whether the time for the monitoring position to be continuously empty exceeds a third threshold or not through the subsequent steps A102 and A103; and determining whether the state of the monitored object is changed from being taken up or out of stock to being normal (such as the monitored object being put back after being viewed or the staff supplementing a new monitored object) according to the subsequent step A106.

Step A108, determining that the state of the monitored object is being taken up, and returning to the step A101.

When a monitored object exists in the monitoring position before the current movement and becomes absent after the movement, it is indicated that the monitored object is just taken away in the current movement, and thus the state of the monitored object can be determined to be being taken up by referring to FIG. 13, then the monitoring image is collected again, and through the subsequent steps A102 and A103, whether the state of the monitored object is changed from being taken up to being out of stock or not is determined according to whether the time that the monitoring position is continuously empty exceeds the third threshold (namely, the monitored object is not in the monitoring position for a long time, which indicates that the monitored object is not taken up to be viewed but is sold to be out of stock); and determining whether the state of the monitored object is changed from being taken up or being out of stock to being normal (such as the monitored object being put back after being viewed or the staff supplementing a new monitored object) according to the subsequent step A106.

It should be understood that the above specific manner of determining the state of the monitored object is exemplary only.

For example, the specific types of the states of the monitored object may be different, such as when a monitored object is placed in the monitoring position of another monitored object, the state of the monitored object may be "position error".

For another example, the specific logic process for determining the state of the monitored object according to the movement state and the real-time state may be different, for example, the state that the monitored object is at risk may be given as long as the monitored object disappearing is found or as long as the movement is found (for example, for monitoring a cultural relic in a museum).

For another example, the specific manner of determining the movement state and the real-time state may be different, for example, the movement state and the real-time state (e.g., whether there is movement, what movement exists, whether there is a monitored object, a specific type of the monitored object, a specific position of the monitored object, etc.) may be determined simultaneously by using the image classifier.

For another example, the determination may be made without "movement state", but by analyzing the monitoring image, the state of the corresponding monitored object (e.g., whether there is a monitored object, a specific type of the monitored object, a specific position of the monitored object, etc.) may be directly determined.

The present disclosure has disclosed exemplary embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the disclosure as set forth in the appended claims.

The invention claimed is:

1. A monitoring device, comprising a carrying unit, the carrying unit is provided with at least one carrying area for carrying a monitored object, and at least part of the carrying area is provided with a corresponding image capturing unit and a corresponding optical path adjusting unit; wherein
the image capturing unit is configured to capture a monitoring image of the carrying area corresponding to the image capturing unit, and the image capturing unit is provided with a preset field of view and is configured to form the monitoring image according to light emitted from the field of view;
at least part of the carrying area having the corresponding image capturing unit and the corresponding optical path adjusting unit is an extension area, and the extension area is positioned outside the field of view of the image capturing unit corresponding to the carrying area where the extension area is positioned;
the optical path adjusting unit is configured to enable the light emitted from the extension area of the carrying area corresponding thereto to enter the image capturing unit from the field of view of the image capturing unit corresponding to the carrying area, wherein
at least a part of optical path adjusting units is a concave lens, and the concave lens is arranged between the image capturing unit corresponding thereto and the carrying area, and is configured to refract light emitted from the extension area of the carrying area corresponding to the concave lens, so that the refracted light is incident into the image capturing unit from the field of view of the image capturing unit corresponding to the carrying area, and wherein
the field of view of the image capturing unit corresponding to the concave lens faces the carrying area corresponding to the concave lens, and the field of view of the image capturing unit is completely located within the range of the concave lens.

2. The monitoring device of claim 1, wherein
all areas in each of at least part of carrying areas are extension areas.

3. The monitoring device of claim 1, wherein
at least part of carrying areas each comprise a base area and the extension area, and the base area is located in the field of view of the image capturing unit corresponding to the carrying area to which the base area belongs.

4. The monitoring device of claim 1, further comprising:
an image processing unit configured to determine a state of the monitored object from the monitoring image;
a prompt unit configured to give a prompt according to the state of the monitored object; and
an output unit configured to output the monitoring image.

5. The monitoring device of claim 1, wherein
the monitoring device is an exhibition device or vending device.

6. A monitoring method, comprising:
acquiring a monitoring image; the monitoring image is captured by the image capturing unit of the monitoring device according to claim 1; and
determining the state of the monitored object according to the monitoring image.

7. The monitoring method of claim 6, wherein the determining the state of the monitored object according to the monitoring image comprises:
determining a movement state of the carrying area according to the monitoring image, and determining a real-time state of the monitored object according to the monitoring image; and
determining the state of the monitored object according to the movement state and the real-time state.

8. A monitoring method, comprising:
acquiring a monitoring image; the monitoring image is captured by the image capturing unit of the monitoring device according to claim 2; and
determining the state of the monitored object according to the monitoring image.

9. The monitoring method of claim 8, wherein the determining the state of the monitored object according to the monitoring image comprises:
determining a movement state of the carrying area according to the monitoring image, and determining a real-time state of the monitored object according to the monitoring image; and
determining the state of the monitored object according to the movement state and the real-time state.

10. A monitoring method, comprising:
acquiring a monitoring image; the monitoring image is captured by the image capturing unit of the monitoring device according to claim 3; and
determining the state of the monitored object according to the monitoring image.

11. The monitoring method of claim 10, wherein the determining the state of the monitored object according to the monitoring image comprises:
determining a movement state of the carrying area according to the monitoring image, and determining a real-time state of the monitored object according to the monitoring image; and determining the state of the monitored object according to the movement state and the real-time state.

12. A monitoring method, comprising:
acquiring a monitoring image; the monitoring image is captured by the image capturing unit of the monitoring device according to claim 11; and
determining the state of the monitored object according to the monitoring image.

13. The monitoring method of claim 12, wherein the determining the state of the monitored object according to the monitoring image comprises:
determining a movement state of the carrying area according to the monitoring image, and determining a real-time state of the monitored object according to the monitoring image; and
determining the state of the monitored object according to the movement state and the real-time state.

* * * * *